United States Patent [19]

Sakayori et al.

[11] E Re. 30,006

[45] Reissued May 22, 1979

[54] PROCESS FOR THE FORMATION OF A POLYOLEFIN COATING LAYER ONTO A METAL SURFACE

[75] Inventors: Seigo Sakayori, Koga; Tomoyosi Kuro, Izumi; Kazuyuki Morita, Sowa; Nobuya Hinooka, Iwakuni; Hirozi Niimi, Waki; Kensuke Komatsu, Iwakuni, all of Japan

[73] Assignees: Mitsui Petrochemical Industries Ltd., Tokyo; Toa Paint Co. Ltd., Osaka, both of Japan

[21] Appl. No.: 909,720

[22] Filed: May 25, 1978

Related U.S. Patent Documents

Reissue of:

[64] Patent No.: 4,048,355
Issued: Sep. 13, 1977
Appl. No.: 525,219
Filed: Nov. 19, 1974

[30] Foreign Application Priority Data

Nov. 22, 1973 [JP] Japan ..... 48-131972

[51] Int. Cl.[2] ..... B05D 1/36

[52] U.S. Cl. ..... 427/375; 156/330; 427/27; 427/185; 427/195; 427/202; 427/308; 427/386; 427/388 A; 427/388 R; 427/410

[58] Field of Search ..... 427/410, 375, 386, 388 R, 427/409, 27, 202, 185, 195, 358; 156/244, 330

[56] References Cited

U.S. PATENT DOCUMENTS

| | | | |
|---|---|---|---|
| 3,156,580 | 11/1964 | Howard | 427/410 |
| 3,488,212 | 1/1970 | MacIntosh et al. | 427/410 |
| 3,505,143 | 4/1970 | Haas et al. | 156/244 |
| 3,594,250 | 7/1971 | Mueller-Tamm et al. | 156/244 |
| 3,616,019 | 10/1971 | Mueller-Tamm et al. | 156/244 |
| 3,619,320 | 11/1971 | Mueller-Tamm et al. | 156/244 |
| 3,634,166 | 1/1972 | Duerkheim | 156/244 |
| 3,932,368 | 1/1976 | McConnell | 427/27 |

FOREIGN PATENT DOCUMENTS 48-79275 10/1973 Japan.

*Primary Examiner*—Ronald H. Smith
*Assistant Examiner*—Janyce A. Bell
*Attorney, Agent, or Firm*—Sherman & Shalloway

[57] ABSTRACT

A process for forming a polyolefin coating layer onto a surface of a metal which comprises coating an uncured epoxy resin layer onto the surface of a metal and melt-bonding a polyolefin modified with an unsaturated carboxylic acid or an anhydride thereof onto the uncured epoxy resin layer coated onto said metal surface. The coating layer has a high bonding strength and excellent water resistance, especially resistance against brine.

33 Claims, No Drawings

PROCESS FOR THE FORMATION OF A POLYOLEFIN COATING LAYER ONTO A METAL SURFACE

Matter enclosed in heavy brackets [ ] appears in the original patent but forms no part of this reissue specification; matter printed in italics indicates the additions made by reissue.

This invention relates to a process for forming a polyolefin coating layer onto a metal surface.

More particularly, the present invention relates to a process for forming a polyolefin coating layer onto a metal surface which coating layer maintains its strong initial bond strength for a semi-permanent period of time and can withstand usage even in brine.

Coating layers of polyolefins have strong resistance against chemicals such as acids, alkalies and certain kinds of organic solvents (e.g. alcohols, ethers, petroleums, etc.,) and good electric insulation. They are also easy to fabricate for coating. For these reasons, they are gaining in usefulness for a variety of applications ranging from lining steel pipes and cans, coating electric cables, devices and components, protective coating layers of glass sheets and so forth. Especially the coating layers of polyolefins are extensively employed nowadays to coat metal surfaces, and various techniques have been developed in this field.

In applying the coating layers of polyolefins onto at metal surface, however, one of the principal difficulties has been the poor adhesion of the coating layer to the metal surface because of their non-polarity. Various methods have been proposed to solve this problem, but none of them has been entirely satisfactory from the viewpoint of practical feasiblity and efficiency. According to one of the methods heretofore proposed, powders of polyolefins are coated onto the metal surface which has been heated up to a temperature far higher than the melting point of the polyolefin used (e.g. 200°–400° C.) whereby a part of the polyolefin is oxidized and forms a polar group thereby to improve its adhesion to the metal. However, adhesiveness of the polyolefin coating layer to the metal in accordance with this method varies to a great extent depending upon the method for coating employed, conditions of coating as well as conditions of the metal surface. Consequently, bond strengths obtained by this method are by no means satisfactory.

According to another conventional method, a polyolefin is compounded in advance with polyisobutylene, butyl rubber, a nitroso compound, etc., so that the adhesion of the polyolefin coating layer to the metal surface is increased. This method however also involves a problem in adhesiveness of the coating layer at a high temperature.

These proposals further includes numerous methods such as effecting a chemical treatment (for example, treatment with phosphoric acid) to the metal surface, applying a blasting onto the metal surface, depositing a pre-coating layer of an adhesive such as polyamide onto the metal surface etc. None of these methods however has succeeded in providing a satisfactory result.

As an alternative, there has been made a new proposal in which a polyolefin is first modified with an unsaturated carboxylic acid or an anhydride thereof such as maleic anhydride, and the modified polyolefin is empolyed as an intermediate layer between the polyolefin coating layer and the metal surface, or is used as the coating layer in place of the polyolefin coating layer, so as to materialize stronger bonding between the coating layer and the metal surface. (For example, Japanese Pat. Publication No. 6384-64, Japanese Pat. Publication No. 23032-65, Japanese Pat. Publication No. 10757-67, etc.). According to this method, the polyolefin coating layer is bonded considerably more strongly onto the metal surface. However, the following problem remains unsolved. When the coating layer is contacted with an aqueous solution containing an electrolyte such as brine or a solution of salt, bond strength thereof decreases remarkably within a short period of time, or at time, the polyolefin coating layer peels off from the metal surface, and impact strength of the metal article deteriorates drastically. Because of these defects, this method can not be used for applications such as coating of a brine pipe.

In a recent proposal a coating layer of a thermo-setting epoxy resin is formed onto a metal surface, and then heat-set perfectly by baking, whereupon a coating layer of a polyolefin modified by an unsaturated carboxylic acid is deposited thereon subsequently (Japanese Pat. Publication No. 29301-73). This method certainly improves the bond strength of the polyolefin coating layer onto the heat-set epoxy resin coating layer to a considerable extent, but hardly any improvement is made with respect to the water resistance, and resistance against brine, of the coating layer.

A principal object of the present invention is therefore directed to provide a process for the formation of a polyolefin coating layer onto a metal surface, which coating layer has not only a high bond strength but also excellent water resistance and resistance against brine.

Another object of the present invention is to provide a metallic article, especially a metallic tubular article having a polyolefin coating layer deposited thereon which has a high bond strength to the metal surface and moreover, has excellent water resistance and resistance against brine.

Other objects of the present invention not specifically mentioned, together with advantages thereof will be understood from the detailed description of the invention to follow.

According to the present invention, there is provided a process for the formation of a polyolefin coating layer onto a metal surface, said process comprising pre-coating an uncured epoxy resin coating layer onto a metal surface, and melt-bonding a polyolefin that has been modified with an unsaturated carboxylic acid or an anhydride thereof onto the uncured epoxy resin coating layer.

The most characteristic feature of the present process resides in pre-coating of the uncured epoxy resin coating layer onto the metal.

It is to be noted that the term "uncured epoxy resin" used in this specification and the appended claims means an epoxy resin which does not contain a curing agent, or an epoxy resin which contains a curing agent, but is "substantially uncured." The expression substantially uncured in this instance means a condition in which gellation has not yet begun.

There is no specific limitation as to the kinds of epoxy resins to be used in the process of the present invention. Any known epoxy resin can therefore be used. A typical example of the epoxy resin is a polycondensate of a polyfunctional halohydrin and a polyhydric phenol which is expressed by the following formula

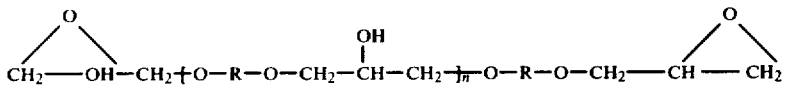

in which R means a dihydric phenol group and n means the degree of polymerization.

Typical examples of the polyfunctional halohydrin include epichlorohydrin and glycerol dichlorohydrin, and typical examples of the polyvalent phenol include resocinol, 2,2-bis (4'-hydroxyphenyl) propane (bisphenol A).

When an epoxy resin which does not contain a curing agent is used in the present process, it is advisably a thermoplastic, high molecular weight epoxy resin having a molecular weight of more than 10,000, preferably 30,000–200,000. (To wit, an epoxy resin having a larger number of n in the aforementioned formula (I)).

When an epoxy resin containing a curing agent is used, on the other hand, it has preferably a molecular weight of more than 500, more preferably 500–200,000.

Any known curing agents can be used in the present invention without any specific limitation. Examples of curing agents include amines such as diethylene triamine (DTA), triethylene tetramine (TTA), tetraethylene pentamine (TPA), dimethylaminopropylamine (DMAPA), diethylaminopropylamine (DEAPA), aminoethylethanolamine (AEEA), methane diamine (MDA), n-aminoethyl piperazine (AEP), methaphenylene diamine, diaminophenyl methane, and epoxyamine-adducts (e.g. diethylene triamine+Epikote 1001); polyamides such as polycondensates of a dimeric acid (for instance, a dimer of linoleic acid) and ethylene diamine or diethylene triamine; acid anhydrides such as phthalic anhydride, tetrahydrophthalic anhydride, Himic anhydride, (Japanese trademark of Hitadi Kasel K.K., Japan) trimeric anhydride, pyromellitic dianhydride; phenol-formaldehyde resin; butylated urea-formaldehyde resin and butylated melamineformaldehyde resin; phenol resins, butylated urea-formaldehyde resin and so forth. A proper curing agent is selected from these agents depending upon curing speed, conditions and the like.

When an epoxy resin containing a curing agent is used, it is of importance in the present invention to melt-bond a modified polyolefin immediately after the epoxy resin is pre-coated onto a metal surface so that curing does not take place substantially before the melt-bonding of the polyolefin coating layer.

As the epoxy resin containing a curing agent, therefore, it is preferred to choose a high temperature curing type epoxy resin whose curing substantially proceeds at a temperature between the melting temperature and the decomposition temperature of a modified polyolefin used. Preferably the high temperature curing type epoxy resin used in the present invention cures at a temperature not lower than 80° C., more preferably at a temperature between 100° and 300° C.

The abovementioned epoxy resin is coated onto a metal surface after it is dissolved or dispersed in a solvent. When the epoxy resin itself is a liquid, it can be coated as such without using a solvent.

Desirably the metal surface is cleaned as must as possible prior to pre-coating of the epoxy resin. Cleaning of the metal surface can be effected by any methods known in the art. If desired, it is cleaned by means of blasting or by chemical treatment such as with phosphoric acid to further activate the metal surface. These treatments enhance the effect of bonding the epoxy resin to the metal surface to a great extent.

The thickness of the epoxy resin coating is not critical, but can be varied over a wide range depending upon the kind of the epoxy resin used. Generally, thicknesses of about 5–10 microns are sufficient.

The modified polyolefin coating layer is melt-bonded to the epoxy resin layer pre-coated on the metal surface while the epoxy resin layer remains substantially uncured.

When a high molecular weight epoxy resin layer which does not contain a curing agent is pre-coated onto the metal surface, the pre-coating layer may be baked at a temperature of above 200° C., preferably 230°–280° C., prior to the melt-bonding of the modified polyolefin coating layer, in order to ensure strong bonding between the epoxy resin layer and the metal surface.

It is to be understood that the term "modified polyolefin" used in this specification and the appended claims denotes not only a polyolefin that is modified with an unsaturated carboxylic acid or an anhydride thereof, that is, a polyolefin copolymerized with the unsaturated carboxylic acid or the anhydride thereof, but also includes a blend of a polyolefin modified with the unsaturated carboxylic acid or anhydride thereof and an unmodified polyolefin.

In addition to the homopolymers of olefins, the basic polyolefins in the present invention also embrace copolymers formed between different kinds of olefins, and copolymers consisting predominantly of an olefin and other monomers copolymerizable therewith such as butadiene, isoprene, vinylacetate, acrylic acid, ethyl acrylate, ethyl ethacrylate and the like. Examples of these suitable polyolefins include lower density polyethylene, medium density polyethylene, high density polyethylene, polypropylene, poly-1-butene, poly-4-methyl-1-pentane, an ethylene-propylene copolymer (containing at least 80 mol % of ethylene or propylene) and an ethylene-1-butene copolymer (containing at least 85 mol % of ethylene or 1-butene). These polyolefins can be used alone or as an admixture of two or more. Of these, most preferred are polyethylenes and polypropylene.

As the unsaturated carboxylic acid or an anhydride thereof that is used as a modifier in the present invention, there can be named an unsaturated aliphatic carboxylic acid, unsaturated alicyclic carboxylic acid, unsaturated aromatic carboxylic acid and an anhydride of these acids. Among these compounds an unsaturated aliphatic carboxylic acid having 3–20, preferably 3–10 carbon atoms, or an anhydride thereof is most suitable.

Specific examples of the abovementioned unsaturated aliphatic carboxylic acid, unsaturated alicyclic carboxylic acid, unsaturated aromatic carboxylic acid and anhydride of these acids include acrylic acid, methacrylic acid, maleic acid, citraconic acid, itaconic acid, fumaric acid, tetrahydrophthalic acid, 5-norbornene-2,3-dicarboxylic acid, 1-butadiene-2,3,4-tricarboxylic acid, 1-pentene-4,5-dicarboxylic acid and parastyrenecarboxylic acid.

The abovementioned carboxylic acids can be used in the free form or in the form of anhydride.

Unsaturated carboxylic acid that is most preferably used in the process of the present invention is a dicarboxylic acid having one carboxyl group at each of the adjacent carbon atoms, and expressed by the following formula:

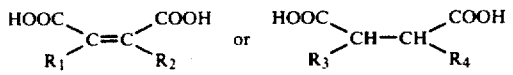

in which $R_1$, $R_2$, $R_3$ and $R_4$ may be the same or different and each represents a hydrogen atom or a saturated or an unsaturated aliphatic group with the proviso that at least one of $R_3$ and $R_4$ is an unsaturated aliphatic group.

Among these compounds, preferred especially are maleic acid and maleic anhydride, most preferably, maleic anhydride.

In order to modify the polyolefin with the abovementioned unsaturated carboxylic acid or the anhydride thereof, an olefin is random-copolymerized in the presence of an unsaturated carboxylic acid or anhydride thereof, or a polyolefin is graft-copolymerized with an unsaturated carboxylic acid or an anhydride thereof. In the present invention, polyolefins that are modified by the latter graft-copolymerization method can be used suitably.

Polymerization can be effected by various methods known in the art. For example, the polyolefin and an unsaturated carboxylic acid or an anhydride thereof are heated in the presence or absence of a solvent, while adding thereto a radical initiator if required, to obtain a polyolefin having grafted thereto the unsaturated carboxylic acid or anhydride thereof. In this instance, vinyl monomers such as styrene can be co-present in carrying out the graft copolymerization. The graft-copolymerization reaction can also be performed in an extruder.

Although there is a slight difference in the amount of the unsaturated carboxylic acid or the anhydride thereof contained in the modified polyolefin between a random copolymer and a graft copolymer, the ratio of modification is generally in the range of $10^{-4}$–10 wt. %, preferably 0.01–5 wt. %. The term "ratio of modification" used herein means the weight percentage of the repeating units of the unsaturated carboxylic acid or the anhydride thereof contained in the modified polyolefin.

When a blend of a modified polyolefin and an unmodified polyolefin is used, blending is made such that the weight percentage of the unsaturated carboxylic acid unit or anhydride unit thereof in the total blend becomes $10^{-4}$–10 wt. %, preferably 0.01–5 wt. %.

In blending an unmodified polyolefin with a modified polyolefin, the principal olefin component of the former is preferably the same type with that of the latter, though an unmodified polyolefin having a different type of principal olefin component may also be used.

Further, the modified polyolefin may contain, whenever desired, an antioxidant, a slipping agent, a heat-stabilizer, a weatherability stabilizer, a pigment, a rust-proofing agent, a filler and a flame-retardant.

The modified polyolefin can be melt-bonded onto a pre-coating layer of an epoxy resin in accordance with known methods for coating a resin layer onto a metal surface, for example, an electrostatic coating method; a fluidized bed coating method; a method in which the modified polyolefin is sprayed and then melt-bonded; a method for melt-bonding a modified polyolefin in the form of a film or a sheet; an extrusion coating method in which a modified polyolefin in the molten state is coated by extrusion; a method in which a sol-like modified polyolefin is coated onto the metal surface and then melted; and so on.

In each of these methods, the modified polyolefin must be contacted with the epoxy resin pre-coating layer while it is still in an uncured condition. Accordingly when the modified polyolefin is applied to an uncured epoxy resin pre-coating layer in forms other than the melt, for example, in the form of powder, film or sheet, it is necessary to melt the modified polyolefin substantially after it is applied to the pre-coating layer.

There is no specific limitation as to the thickness of the modified polyolefin layer. Thickness can be varied over a wide range in accordance with the intended usage of a coated metal article. Generally, thickness of about 10μ–1 cm is sufficient.

In the present invention, another layer may be formed further onto the modified polyolefin coating layer, if desired.

Thus the process of this invention provides a metallic article which is coated with the modified polyolefin coating layer.

In order to obtain a stronger bonding of the modified layer when a high molecular weight epoxy resin which does not contain a curing agent is used as a pre-coating layer, it is desirable to heat the metal surface up to a temperature of at least as high as 200° C., preferably between 230° and 280° C., at the same time or immediately after the modified polyolefin coating layer is applied to the pre-coating layer so as to meltseal in onto the epoxy resin pre-coating layer.

When an epoxy resin containing a curing agent is used, on the other hand, the epoxy resin pre-coating layer must be cured after the modified polyolefin coating layer is applied thereto. Curing must be effected as perfectly as possible. As noted in the foregoing paragraphs, however, it is essentially required to prevent the curing from proceeding substantially before the modified polyolefin coating layer is melt-bonded.

The curing temperature varies depending upon the kind of the epoxy resin as well as the curing agent used and other conditions. However, the curing temperature must be at least higher than the melting temperature of the modified polyolefin. Generally, the curing temperature is 80°–350° C., more preferably 100°–300° C.

The curing time required to perform curing substantially is generally from about several second to 10 hours.

Thus in accordance with the present invention, there is provided a process for forming onto a surface of metallic articles such as water supply pipes, industrial pipes, brine pipes, plates, containers, wire protection aluminum, etc., a polyolefin coating layer which has a strong bonding strength to the metal surface, excellent water resistance and resistance against brine and which can withstand usage for a semi-permanent period of time. The metallic articles to be coated by the polyolefin coating layer may be made of metals such as iron, aluminum, copper, tin, zinc, alloys of these metals or other metals plated with the former metals.

The coated metallic articles in accordance with the present invention have a lower layer consisting of an epoxy resin having a molecular weight of molecular weight of more than 10,000 and which does not contain a curing agent on its surface, and an upper layer of a polyolefin which is modified with an unsaturated carboxylic acid or an anhydride thereof and which is heat-bonded onto said lower layer of epoxy resin. The metallic article of the above-described type are novel, and they constitute a part of the characterizing features of the present invention.

The present invention will be further illustrated by means of the following examples and controls which, however, are not in the least intended to limit the scope of the present invention. In the examples to follow, the term "parts" designates "parts by weight" unless otherwise stipulated.

EXAMPLES 1-9 AND CONTROLS 1-6

Samples were prepared using respectively epoxy resins and modified polyolefins in accordance with the method, all being mentioned below. The bonding properties of each sample were measured, and the results are shown in Table 1.

| Epoxy Resin | |
|---|---|
| (1) Epikote OL-53-B-40 (an epoxy resin having a molecular weight of about 80,000 and a solids content of 40%; a product of Shell Co.) | 40 parts |
| Xylol | 40 parts |
| Butanol | 20 parts |
| Total: | 100 parts |
| (2) Epikote OL-53-B-40 | 40 parts |
| BKS-2315 (a phenol resin having a solids content of 50%; a product of Showa Union Gosei, K.K.) | 3 parts |
| Xylol | 40 parts |
| Butanol | 17 parts |
| Total: | 100 parts |
| (3) Epikote 1007 (an epoxy resin having a molecular weight of about 3,000; a product of Shell Co.) | 35 parts |
| BKS-2315 | 30 parts |
| Toluol | 70 parts |
| Butanol | 40 parts |
| Methyl ethyl ketone | 15 parts |
| Ethyl cellosolve (Ethyleneglycol monoethyl ether) | 10 parts |
| Total: | 200 parts |
| (4) Epikote 1007 | 35 parts |
| Uban 10S (a butylated urea formaldehyde resin having a solids content of 50; a product of Mitsui Toatsu K.K.) | 30 parts |
| Toluol | 40 parts |
| Butanol | 70 parts |
| Methyl ethyl ketone | 15 parts |
| Ethyleneglycol monoethyl ether | 10 parts |
| Total: | 200 parts |
| (5) Epikote 1001 (an epoxy resin having a molecular weight of about 1,000, a product of Shell Co.) | 50 parts |
| VERSAMIDE 115 (a polyamide resin having an amine value of 238 and a viscosity of 35 poise at 75° C.; a product of General Mill Co.) | 50 parts |
| Methyl isobutyl ketone | 25 parts |
| Xylene | 50 parts |
| Butanol | 25 parts |
| Total: | 200 parts |

B. Modified Polyolefin:

The following polyolefins were first provided.

| Type | Name | Density* (g/cc) | M.P.** | M.I.* |
|---|---|---|---|---|
| I | Polyethylene | 0.944 | 123° C. | 35 g/10 min. |
| II | Polyethylene | 0.920 | 124° C. | 10 g/10 min. |
| III | Polyethylene | 0.925 | 120° C. | 4 g/10 min. |
| IV | Polypropylene | 0.91 | 145° C. | 6.5 g/10 min. |

*Density: ASTM D1505-67
**Melting Point: ASTM D2117-64
***Melt Index: ASTM D1238-65T Each of the abovementioned polyolefins was graft copolymerized with maleic anhydride or acrylic acid or 5-norbornene-2,3-dicarboxylic acid to prepare a graft copolymer.

| Type | Polyolefin used | Type of acid used | Ratio of modification |
|---|---|---|---|
| XI | I | Maleic anhydride | 1.0 wt. % |
| XII | I | Maleic anhydride | 0.05 wt. % |
| XIII | II | Maleic anhydride | 1.0 wt. % |
| XIV | III | Maleic anhydride | 1.0 wt. % |
| XV | IV | Maleic anhydride | 2.0 wt. % |
| XVI | I | Acrylic acid | 2.0 wt. % |
| XVII | I | 5-norbornene-2,3-dicarboxylic acid | 2.0 wt. % |

Modified polyolefins were prepared using the abovementioned graft copolymers.

| Type | Graft copolymer (parts) | Polyolefin (parts) | | Particle size (mesh) |
|---|---|---|---|---|
| (a) | XI (5) | I | (95) | 150-320 |
| (b) | XII (100) | — | | 150-320 |
| (c) | XIII (5) | II | (95) | 60-200 |
| (d) | XIV (5) | III | (95) | |
| (e) | XV (5) | IV | (95) | 150-320 |
| (f) | XV (5) | IV | (95) | 150-320 |
| (g) | XVI (5) | I | (95) | 150-320 |
| (h) | XVII (5) | I | (95) | 150-320 |

*The composition was pelletized to form spheres having a diameter of about 3 mm.

C. Method of Preparing Sample Plates

1. Material and size of metal sample plates:

A cold rolled steel strip having a size of 1.0×70×150 mm and a 1-inch diameter steel pipe (for extrusion coating only).

2. Pretreatment of metal sample plates:

Surface treatment with trichloroethylene or a zinc phosphate type treating agent.

3. Coating of an adhesive onto metal sample plates:

The adhesive is flow-coated onto the pre-treated metal sample plates and is left standing for 30 minutes at an ambient temperature.

4. Coating of modified polyolefin:

Modified polyolefin is coated onto the metal sample plates coated with the adhesive in the following manner.

I. Electrostatic powder coating:

Using 12 l of "Stajet" (a product of Sames Co.,), coating is effected at an impressed voltage of −60KV so that the thickness of the dried coating layer becomes 200-300μ. After being heated at 200° C. for 20 minutes [for epoxy resins (2), (3) and (4)], the samples are cooled with water. Likewise the samples are heated at 130° C. for 30 minutes [for epoxy resin (5)] and then cooled by water.

II. Flluidized bed coating:

After the sample plate is preheated at 280° C., it is dipped into a fluidized bed of a modified polyolefin to effect coating so that thickness of the coating layer becomes to about 300μ. Thereafter it is heated at 260° C. for 5 minutes and then cooled with water.

III. Extrusion coating:

The steel pipe coated with the adhesive is preheated at 250° C. whereupon a modified polyolefin is extrusion coated thereonto at an extrusion resin temperature of 220° C. and extrusion speed of 5 m/min. to form a coating layer in thickness of 1 mm. Thereafter the sample is cooled rapidly with water.

D. Testing Method

1. Crosscut Adhesion Test:

Using a double-edged cutter ("NT Cutter"), the coating layer is cut to form 100 pieces of squares with intervals of 1 mm, onto which a cellophane tape is adhered. The cellophane tape is peeled off rapidly, and the number fo remaining squares is counted. (Paint Testing Manual, ASTM Speical Technical Publication 500 (1972))

2. Peel Strength:

Peel strength is measured when the coating layer is peeled off at an angle of 90° C. and speed of 50 mm/min. by the use of an Instron tester.

3. Resistance against Brine:

The sample plate is dipped in a 3% aqueous solution of common salt at 60° C., and the time that passes until the coating layer peels off is measured.

Table 1

| Example No. | Pre-treatment of metal | Epoxy resin | Modified polyolefin | Coating method | Initial Bond Strength: Cross cut test | Initial Bond Strength: Peel strength (kg/cm) | Durability Resistance against brine (hrs.) |
|---|---|---|---|---|---|---|---|
| Example 1 | Trichloroethylene | (3) | a | Electrostatic powder coating | 100/100 | > 2.0 | > 500 |
| Control 1 | " | none | a | " | 100/100 | > 2.0 | 24 |
| 2 | " | none | f | " | 100/100 | > 2.0 | 24 |
| 3 | " | (3) | Polyethylene I** | " | 0/100 | 0 | — |
| 4 | " | (3) | Polypropylene IV*** | " | 0/100 | 0 | — |
| 5* | " | (3) | a | " | 70/100 | 1.0 | 100 |
| Example 2 | " | (3) | f | " | 100/100 | > 2.0 | > 500 |
| 3 | " | (3) | g | " | 80/100 | 1.5 | 200 |
| 4 | " | (3) | h | " | 100/100 | > 2.0 | > 500 |
| 5 | Zinc phosphate | (3) | a | " | 100/100 | > 2.0 | > 1000 |
| 6 | Trichloroethylene | (2) | a | " | 100/100 | > 2.0 | > 500 |
| 7 | " | (4) | b | " | 100/100 | > 2.0 | > 500 |
| 8 | " | (5) | a | " | 100/100 | > 2.0 | > 500 |
| 9 | " | (4) | f | " | 100/100 | > 2.0 | > 500 |
| 10 | " | (1) | c | Fluidized bed coating | 100/100 | 10 | > 500 |
| 11 | " | (1) | c | " | 100/100 | 8 | > 500 |
| 12 | " | (1) | d | Extrusion coating | — | 10 | > 500 |
| Control 6 | " | none | d | " | — | 10 | 48 |

*The modified polyolefin is coated after the epoxy resin is cured in advance.
 & *Refer to "B. Modified Polyolefin" in Examples 1-9 and Controls 1-6.

What is claimed is:

1. A process for coating a metal surface with a polyolefin comprising:

I. coating a metal surface with a first layer consisting essentially of an uncured epoxy resin and least one curing agent; and II. melt-bonding onto the first uncured layer, a second layer which is:

A. a first polyolefin modified by copolymerization with one member of the group consisting of:

i. an unsaturated dicarboxylic acid having the carboxylic groups attached to adjacent carbon atoms, ii. an anhydride of the acid of (i); or B. a blend of polyolefins consisting essentially of:

i. a second polyolefin, and ii. the modified first polyolefin of (A), the polyolefin of (B) (i) and (B) (ii) being the same or different, with the provisos that: (1) for (A), the weight percentage of the repeating units of (A) (i) or (A) (ii) is from $10^{-4}$ to 10% of the modified polyolefin; and (2) for (B), the weight percentage of the repeating units of (B) (ii) is from $10^{-4}$ to 10% of the polyolefin blend.

2. The process of claim 1, wherein the second layer is (A).

3. The process of claim 2, wherein (A) (i) is present, and is selected from the group consisting of: maleic acid; citraconic acid; fumaric acid; 5-norbornene-2,3-dicarboxylic acid; and 1-pentene-4,5-dicarboxylic acid.

4. The process of claim 2, wherein (A) (ii) is present and is selected from the group consisting of anhydrides of: maleic acid; citraconic acid; fumaric acid; 5-norbornene-2,3-dicarboxylic acid; and 1-pentene-4,5-dicarboxylic acid.

5. The process of claim 2 wherein the polyolefin is selected from at least one of the group consisting of polyethylene and polypropylene.

6. The process of claim 1, wherein the second layer is (B).

7. The process of claim 6, wherein (B) (ii) is modified by copolymerization with a member of the group consisting of: maleic acid; citraconic acid; fumaric acid; 5-norbornene-2,3-dicarboxylic acid; and 1-pentene-4,5-dicarboxylic aicd; and 1-pentene-4,5-dicarboxylic acid.

8. The process of claim 6, wherein (B) (ii) is modified by copolymerization with the anhydride of an acid selected from the group consisting of: maleic acid; citraconic acid; fumaric acid 5-norbornene-2,3-dicarboxylic acid; and 1-pentene-4,5-dicarboxylic acid.

9. The process of claim 6 wherein the first and second polyolefins are selected from at least one of the group consisting of polyethylene and polypropylene.

10. The process of claim 5, wherein the polyolefin is modified by graft copolymerization with maleic anhydride.

11. The process of claim 9 wherein the polyolefin is modified by graft copolymerization with maleic anhydride.

12. The process of claim 1 wherein the uncured epoxy resin has a molecular weight of from 500 to 200,000.

13. The process of claim 1 wherein the uncured epoxy resin has a curing temperature of from 100° to 300° C.

14. The process of claim 1 wherein the weight percentage of proviso (1) is from 0.01 to 5.

15. The process of claim 1 wherein the weight percentage of proviso (2) is from 0.01 to 5.

16. The process of claim 1 including the additional step of heat-curing the first layer after the second layer has been applied, the curing temperature being from 80° to 300° C.

17. The process of claim 16 wherein the curing temperature is from 100° to 300° C.

18. The process of claim 16 wherein the second layer is (A), the polyolefin is selected from at least one of the group consisting of polyethylene and polypropylene and is modified by graft copolymerization with maleic anhydride.

19. The process of claim 16 wherein the second layer is (B), the polyolefin is selected from at least one of the group consisting of polyethylene and polypropylene and is modified by graft copolymerization with maleic anhydride.

*20. A process for coating a metal surface with a polyolefin comprising:*

*I. coating a metal surface with a first layer consisting essentially of an uncured epoxy resin; and*

*II. melt-bonding onto the first uncured layer, a second layer which is:*

*A. a first polyolefin modified by copolymerization with one member of the group consisting of:*

*i. an unsaturated dicarboxylic acid having the carboxylic groups attached to adjacent carbon atoms, and*

*ii. an anhydride of the acid of (i); or*

*B. a blend of polyolefins consisting essentially of:*

*i. a second polyolefin, and*

*ii. the modified first polyolefin of (A), the polyolefin of (B) (i) and (B) (ii) being the same or different, with the provisos that: (1) for (A), the weight percentage of the repeating units of (A) (i) or (A) (ii) is from $10^{-4}$ to 10% of the modified polyolefin; and (2) for (B), the weight percentage of the repeating units of (B) (ii) is from $10^{-4}$ to 10% of the polyolefin blend.*

*21. The process of claim 20, in which the uncured epoxy resin is an epoxy resin which does not contain a curing agent and which has a molecular weight of not less than 10,000.*

*22. The process of claim 21, wherein the second layer is melt-bonded to the first layer at a temperature of at least 200° C.*

*23. The process of claim 21, wherein the second layer is (A).*

*24. The process of claim 23, wherein (A) (i) is present and is selected from the group consisting of: maleic acid; citraconic acid; fumaric acid; 5-norbornene-2,3-dicarboxylic acid; and 1-pentene-4,5-dicarboxylic acid.*

*25. The process of claim 23, wherein (A) (ii) is present and is selected from the group consisting of anhydrides of: maleic acid; citraconic acid; fumaric acid; 5-norbornene-2,3-dicarboxylic acid; and 1-pentene-4,5-dicarboxylic acid.*

*26. The process of claim 23, wherein the polyolefin is selected from at least one of the group consisting of polyethylene and polypropylene.*

*27. The process of claim 21, wherein the second layer is (B).*

*28. The process of claim 27, wherein (B) (ii) is modified by copolymerization with a member of the group consisting of: maleic acid; citraconic acid; fumaric acid; 5-norbornene-2,3-dicarboxylic acid; and 1-pentene-4,5-dicarboxylic acid.*

*29. The process of claim 27, wherein (B) (ii) is modified by copolymerization with the anhydride of an acid selected from the group consisting of: maleic acid; citraconic acid; fumaric acid; 5-norbornene-2,3-dicarboxylic acid; and 1-pentene-4,5-dicarboxylic acid.*

*30. The process of claim 27, wherein the first and second polyolefins are selected from at least one of the group consisting of polyethylene and polypropylene.*

*31. The process of claim 26, wherein the polyolefin is modified by graft copolymerization with maleic anhydride.*

*32. The process of claim 29, wherein the polyolefin is modified by graft copolymerization with maleic anhydride.*

*33. The process of claim 21, wherein the uncured epoxy resin has a molecular weight of from 30,000 to 200,000.*

* * * * *